Feb. 11, 1969   E. G. CROSS   3,427,024
SWING SET CONSTRUCTION
Filed March 24, 1966
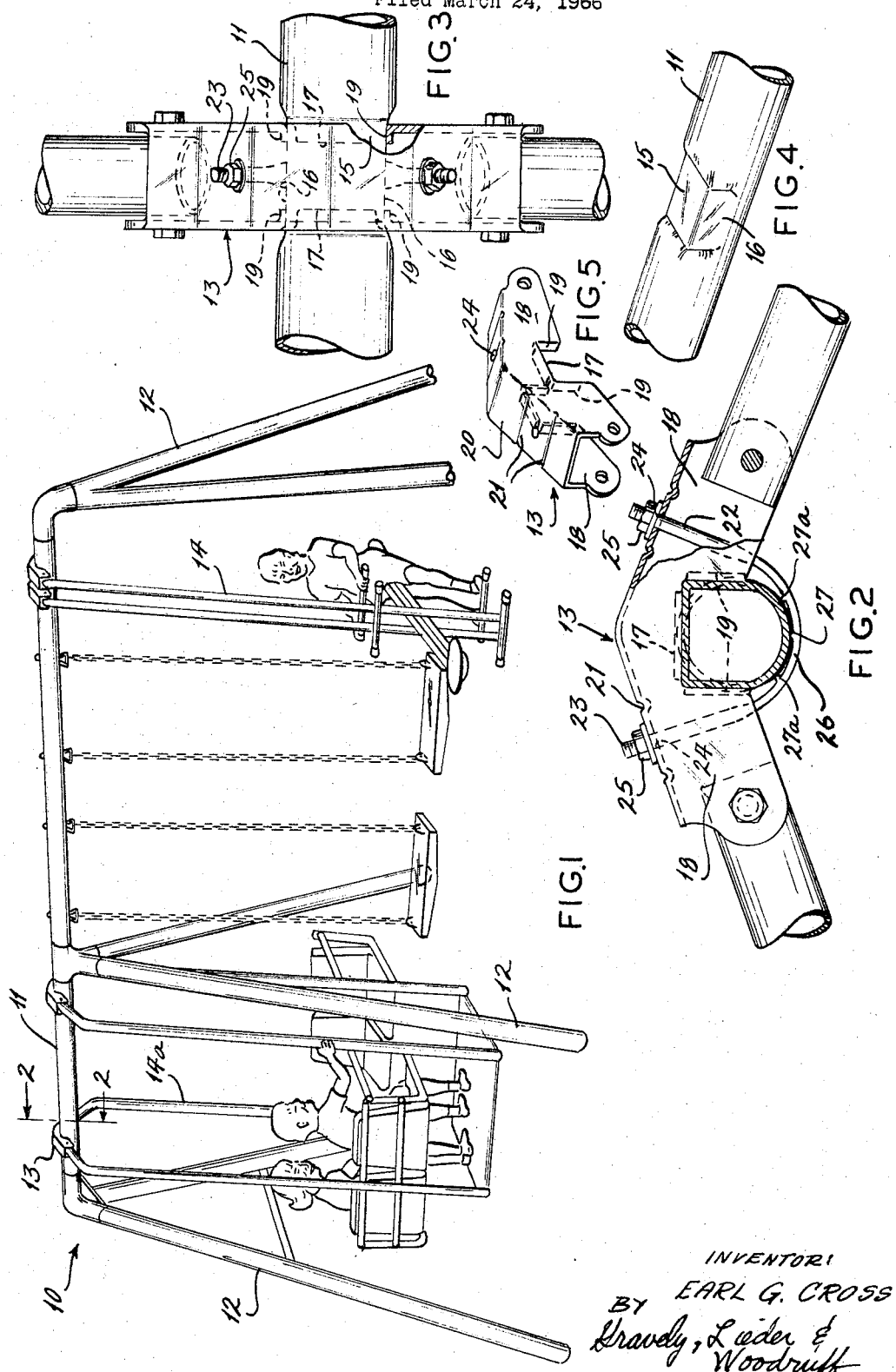
INVENTOR:
EARL G. CROSS
BY Gravely, Lieder & Woodruff
ATTORNEYS of Missouri

United States Patent Office 3,427,024
Patented Feb. 11, 1969

3,427,024
SWING SET CONSTRUCTION
Earl G. Cross, Du Quoin, Ill., assignor to Turco Manufacturing Company, Du Quoin, Ill., a corporation of Missouri
Filed Mar. 24, 1966, Ser. No. 537,230
U.S. Cl. 272—87
Int. Cl. A63g 9/12
2 Claims

ABSTRACT OF THE DISCLOSURE

A swing set in which the swings are suspended from a non rotatable bracket mounted on a bar of circular cross section. At the point of attachment of the bracket, the bar has flat upper and side faces. The bracket has side and top walls and the side walls have a cut out opening the same size and shape as the cross section of the bar at the point of attachment. The edges of the cut outs also have inwardly directed flanges to engage the surface of the bar and increase the bearing area. The bracket is held on the bar by a U-shaped bolt member having a flat central portion which engages the underside of the bar, and threaded end portions which pass through holes in the bracket top wall, on each side of the bar.

---

The present invention relates to swing sets and specifically relates to a bracket or fitting on a top horizontal support member to suspend a swinging seat arrangement, such as a glider or lawn swing.

Heretofore it has been necessary to weld the brackets which support bar supported swings, such as gliders and lawn swings, to the horizontal support member. This required that the bracket be welded to the horizontal cross member prior to painting. Also, when packaged the bracket tended to scratch the other parts and made it impossible to silk screen a colored design on the horizontal member.

Using the present invention, the brackets are packaged separately from the support member, thus saving welding equipment in the plant; and all of the parts are individually painted, resulting in a better paint coating and facilitating painting in the plant.

One of the principal objects of the present invention is to provide a bracket and horizontal support bar construction wherein the horizontal member has a flat portion and the bracket has a straight sided cut-out portion which fits over the flattened portion of the support member to non-rotatably mount the bracket on the support member.

Another object of the invention is to provide a bracket member which is non-rotatably positioned on a horizontal member and which includes a mechanical removable fastening device to eliminate the necessity of welding the bracket to the support member.

These and other objects and advantages of the present invention will become apparent hereinafter.

The present invention comprises a bracket for a swing set arrangement, including a flattened support member and a bracket with straight sided cut-outs mounted on the flattened portion of the support member and means for retaining the bracket on the support member. The present invention further comprises the article and structure hereinafter described and claimed.

In the drawings, wherein like numbers refer to like parts wherever they occur;

FIG. 1 is a fragmentary perspective view of a swing set embodying the present invention;

FIG. 2 is an enlarged fragmentary view partly in section taken along line 2—2 of FIG. 1;

FIG. 3 is a plan view of the structure of FIG. 2;

FIG. 4 is a fragmentary perspective view of the horizontal bar member which forms part of the present invention; and FIG. 5 is a perspective view of the bracket which forms the other part of the present invention.

FIG. 1 shows a swing set 10 having an overhead horizontal longitudinal suspending member 11 (which preferably is a hollow tubular member) supported by depending legs 12 which normally are positioned adjacent to each end. There may also be a set of legs 12 intermediate the ends of the horizontal member 11. A bracket 13 is mounted on the longitudinal suspending member 11 and extends outwardly from the sides thereof to pivotally mount a glider 14 or other swinging mechanism. The bracket 13 also can be used to support a lawn swing 14a.

The construction of engaging sections of the longitudinal support member 11 and the bracket 13 is shown in more detail in FIGS. 2–5 and comprises flattened portions on the top 15 and sides 16 of the tubular member 11 and a straight sided open ended cut-out 17 on the bracket member 13 which engages snugly the flat sided portions 15 and 16 of tubular member 11 to non-rotatably mount the bracket 13 on the tubular member 11 (FIGS. 2 and 3).

The bracket 13 itself comprises opposed aligned flanges 18, each of which is provided with the open ended three-sided cut-out 17 having inturned edges 19 to provide additional bearing surface on the flattened portions 15 and 16 of the tubular member 11. A web 20 joins the flanges 18 and is provided with transverse strengthening ribs 21 therein.

The preferred arrangement for fastening the bracket 13 to the support member 11 comprises a strap 22 having threaded ends 23 which extend through openings 24 in the bracket web 20 between the strengthening ribs 21. Nuts 25 lock the strap 22 to the bracket 13 so as to positively engage the bracket 13 with the tubular member 11. The strap 22 has a flattened mid-section 26 which provides additional bearing surface against the curved under portion of the tubular member 11. Dimples 27 and 27a engage the under surface of the tubular member 11 and assist in locking the strap 22 to the tubular member 11.

Thus it is seen that the present invention achieves all of the objects and advantages sought therefor.

This invention is intended to cover all changes and modifications of the examples of the invention herein chosen for purposes of the disclosure, which do not constitute departures from the spirit and scope of the invention.

What is claimed is:

1. In a swing set construction combination including a round tubular overhead longitudinal suspending member supported by the depending legs with a swinging member pivotally suspended from a bracket mounted on the longitudinal suspending member, the improvement comprising a flattened portion on the round longitudinal member and a correspondingly straight sided opening in the bracket, the bracket opening being positioned over the flattened portion of the longitudinal member to non-rotatively fix the bracket to the longitudinal member, and means for fastening the bracket to the longitudinal member, the bracket including a pair of flanges having the straight sided openings formed therein, a web connecting the flanges on the top side, and inturned edges on the flange openings, the edges bearing against the flattened portion of the longitudinal member.

2. In a swing set construction combination including a round tubular overhead longitudinal suspending member supported by depending legs with a swinging member pivotally suspended from a bracket mounted on the longitudinal suspending member, the improvement comprising a flattened portion on the round longitudinal member and a correspondingly straight sided opening in the bracket, the bracket opening being positioned over the flattened portion of the longitudinal member to non-rotatively fix the bracket to the longitudinal member, and means for fastening the bracket to the longitudinal member, the bracket including a pair of flanges having the straight sided openings formed therein, a web connecting the flanges on the top side, and including a retaining strap having its ends anchored in the flange of the bracket and bearing against the underside of the longitudinal member to retain the bracket on the longitudinal member, the strap being threaded on its ends and flattened in the center, the center bearing against the curved underside of the longitudinal member, and including at least three projections in engagement with the curved underside of the longitudinal member.

References Cited

UNITED STATES PATENTS

| | | | |
|---|---|---|---|
| 1,056,188 | 3/1913 | Linton | 24—277 |
| 1,509,986 | 9/1924 | Sprich | 272—90 |
| 3,145,013 | 8/1964 | Grudoski | 272—85 XR |
| 3,271,029 | 9/1966 | Grudoski | 248—370 XR |

RICHARD C. PINKHAM, *Primary Examiner.*

PAUL E. SHAPIRO, *Assistant Examiner.*

U.S. Cl. X.R.

24—277; 248—370, 214; 297—245